UNITED STATES PATENT OFFICE.

THOMAS P. DEVOR, OF MILLERSTOWN, PENNSYLVANIA.

IMPROVEMENT IN CIDER-BITTERS.

Specification forming part of Letters Patent No. 129,937, dated July 30, 1872.

Specification describing a new and useful Improvement in Cider-Bitters, invented by THOMAS P. DEVOR, of Millerstown, in the county of Perry and State of Pennsylvania.

My invention has for its object to furnish improved cider-bitters, which shall contain lactic acid but no acetic acid, which, in combination with aromatic bitters, shall improve digestion, be tonic and aperient, shall remove flatulence, counteract the effects of drunkenness, be a good drink for warm climates and seasons, and which shall be beneficial in many bilious complaints and in many forms of dyspepsia; and it consists in the cider-bitters, prepared in the manner hereinafter more fully described.

In preparing the cider-bitters a large vat is connected with the cider-mill, which is ground full of good ripe apples during the day, and allowed to stand all night. The next morning the contents of the vat are run through a strainer, and the residuum or pomace is pressed, and the expressed juice is also strained.

The cider thus obtained is put into large hogsheads or vats, placed in a cellar or other cool place. In about forty-eight hours after it has turned or fermented the feculent parts will be thrown to the surface, which parts, as soon as the process has been completed, are skimmed off, or else the cider is drawn off from beneath the scum before it sinks, and put into barrels. Apple-twigs are then boiled in a portion of this cider in the proportions of one pound of apple-twigs to one gallon of cider. In this decoction, when cool, are dissolved the whites of eggs, in the proportion of six eggs to one quart of the decoction. One quart of this solution is poured into each barrel. The cider is allowed to stand twenty-four hours, and is then racked off, and ten pounds of refined white sugar are put into each barrel; one pound of birch-bark and two pounds of wild-cucumber (magnolia glauca) pods or bark are also put into each barrel. The cider is then allowed to stand fourteen days, and is then racked off into air-tight barrels by means of a siphon or otherwise.

The cider may be moved to a warmer climate during the winter, or may be bottled in the spring.

Having thus described my invention, I claim as new and desire to secure by Letters Patent—

Improved cider-bitters, prepared in substantially the manner herein set forth and described.

THOMAS P. DEVOR, M. D.

Witnesses:
GEO. L. BUCHER,
JOHN RICE.